Figure 1A:
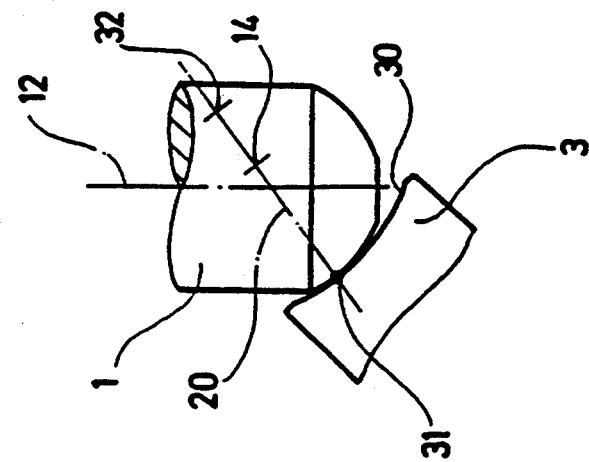

United States Patent [19]

Dorsch

[11] Patent Number: 5,417,130
[45] Date of Patent: May 23, 1995

[54] PROCESS AND DEVICE FOR MACHINING AND WORKPIECES TO SHAPE

[75] Inventor: Joachim Dorsch, Präzisionsmaschinenbau Unterreichenbach, Germany

[73] Assignee: Carl Benzinger GmbH & Co., Unterreichenbach, Germany

[21] Appl. No.: 768,983

[22] PCT Filed: Mar. 12, 1990

[86] PCT No.: PCT/EP90/00395
§ 371 Date: Oct. 8, 1991
§ 102(e) Date: Oct. 8, 1991

[87] PCT Pub. No.: WO90/11859
PCT Pub. Date: Oct. 18, 1990

[30] Foreign Application Priority Data

Apr. 12, 1989 [DE] Germany .......... 39 11 986.6

[51] Int. Cl.[6] .............. B23B 1/00; B23B 5/40
[52] U.S. Cl. .......................... 82/1.11; 82/12; 82/118
[58] Field of Search .......... 409/84, 131, 132, 199; 82/1.11, 13, 12, 118, 123; 51/124 L, 284 R; 407/64; 142/11, 39

[56] References Cited

U.S. PATENT DOCUMENTS

| 517,004 | 3/1894 | Grant | 82/13 |
| 3,492,764 | 2/1970 | Dalton | 51/124 L |
| 3,835,528 | 9/1974 | Garrett | 29/560 |
| 3,986,433 | 10/1976 | Walsh et al. | 409/199 X |
| 4,928,435 | 5/1990 | Misaki et al. | 51/124 L X |
| 4,947,715 | 8/1990 | Council, Jr. | 51/124 L X |
| 4,968,195 | 11/1990 | Hayakawa et al. | 409/84 |
| 4,989,316 | 2/1991 | Logan et al. | 409/84 X |

FOREIGN PATENT DOCUMENTS

| 0037281 | 3/1977 | Japan | 409/199 |
| 2063117 | 8/1981 | United Kingdom | 51/124 L |
| 268857 | 5/1971 | U.S.S.R. | 407/64 |
| 0757263 | 8/1980 | U.S.S.R. | 409/132 |

Primary Examiner—Z. R. Bilinsky
Attorney, Agent, or Firm—Kenyon & Kenyon

[57] ABSTRACT

A process and device for machining a workpiece supported within a workpiece holder and having a tool which has a machining zone for machining the workpiece and supported within a tool holder. The workpiece and the tool are moved relative to one another in a machining movement for removing workpiece material to form a curved surface on the workpiece, and only a portion of the machining zone of the tool acts upon the workpiece in substantially all machining positions and forms an instantaneous machining zone. The tangent of the machining zone of the tool and the tangent of the surface of the workpiece are each oriented substantially at a right angle with respect to the direction of removal of material from the workpiece and substantially coincide within the instantaneous machining zone.

21 Claims, 8 Drawing Sheets

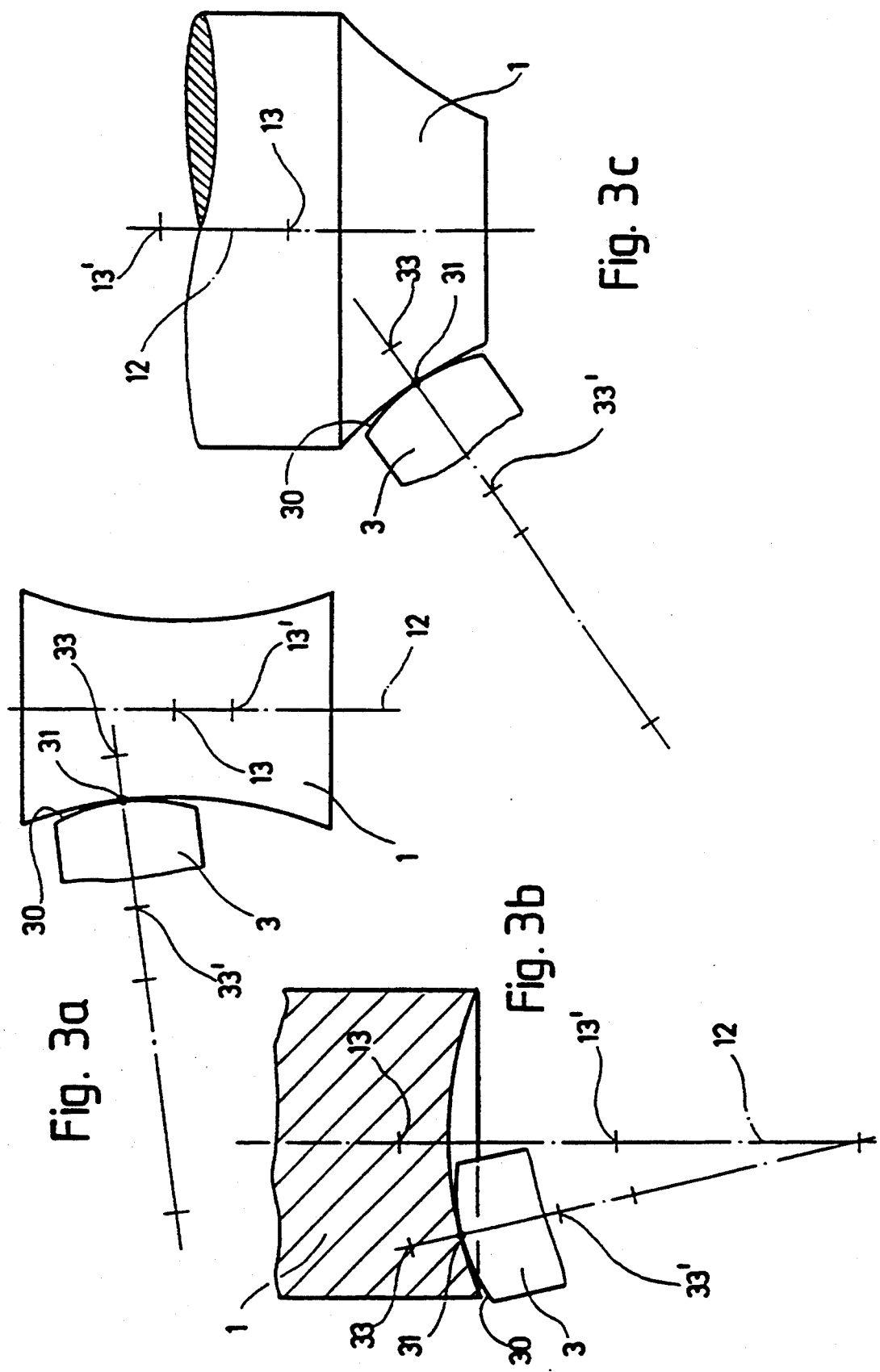

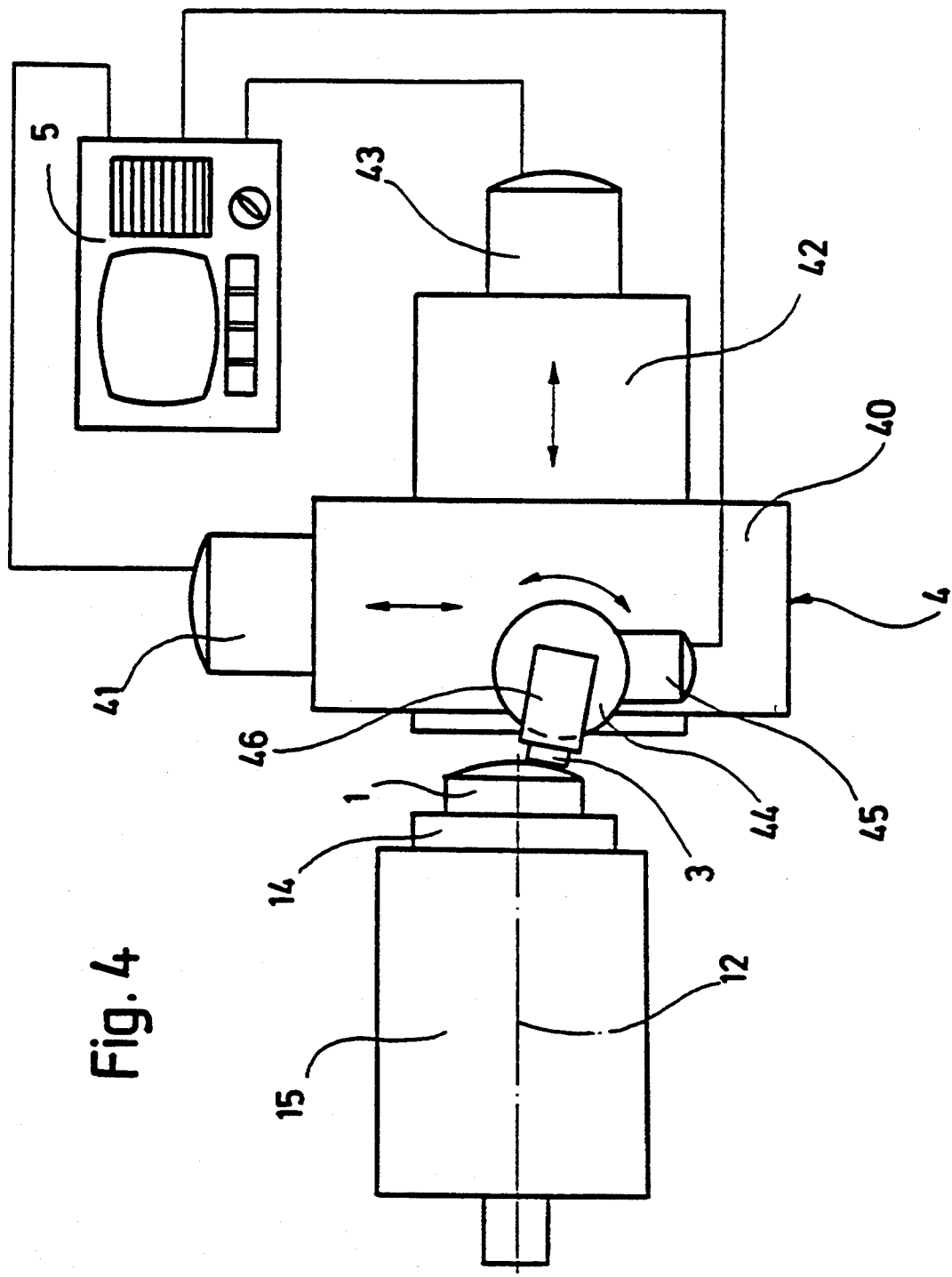

PROCESS AND DEVICE FOR MACHINING AND WORKPIECES TO SHAPE

The invention relates to a process and device for machining workpieces to shape, where the workpiece to be machined and a tool acting on the workpiece, which removes workpiece material mechanically, thermally or erosively, to produce a curved workpiece surface, are moved relative to one another in a machining movement which results from a removal movement and a positioning movement, and where the tool demonstrates a machining zone which acts on the workpiece surface to be machined and is extended in length or expansive in area, and, if necessary, is curved in its extent or expanse. Material-removing machining methods are, for example, lathing, grinding or milling, where the machining zone of the tool is formed as a cutting edge of a cutting wedge, especially as the main blade of a rotary chisel, or as the grinding cup of a grinding tool, depending on the machining method selected.

In the CNC-assisted duplicating process, it is already known that a tool with an extended or convex-curved blade is passed over the surface of a workpiece, which can be rotating, if necessary, by a movement in two axes, in such a way that a desired contour is followed. The cutting point of the tool migrates over the tool during the cutting movement, so that the precision of the workpiece surface to be finished is essentially dependent on the precision of the blade geometry. However, the latter leaves something to be desired, partly due to the wear phenomena which gradually occur at the blade. In addition, both convex and concave workpieces are machined with the convex tool, which leads to imprecision in the surface finish, especially for convex workpieces, as the result of poorly adapted surface curvature between the workpiece and the tool.

The invention is based on the task of developing a process and a device of the type stated initially, with which any desired curvature and curvature variations can be produced in the workpiece surface, with a high degree of precision and surface quality.

To accomplish this task, it is proposed, according to the invention, that the tool and the workpiece be moved relative to one another in such a way that the machining zone of the tool, in all machining positions, acts on the workpiece surface substantially at a point or a short segment of the tool, in comparison with the extent or expanse, and that the tangents through the machining zone of the tool and the workpiece surface to be produced, which run substantially at right angles to the removal direction, coincide at the instantaneous machining positions. With the process according to the invention, a type of peeling process is therefore carried out, in which the machining zone of the tool moves along points of the contour of the workpiece surface to be machined, with the prerequisite of coinciding tangents of the machining zone and the workpiece surface at the instantaneous machining positions.

According to a preferred form of the invention, the curvature of the machining zone of the tool is approximated to the workpiece surface to be produced, to the extent that a concave machining zone curvature is selected for convex workpiece surfaces, and a convex machining zone curvature is selected for concave workpiece surfaces. It is practical to make this selection in such a way that in the case of convex workpiece curvature, the concave curvature of the machining zone of the tool has a greater radius of curvature than the greatest radius of curvature of the workpiece, while in the case of concave workpiece curvature, the convex curvature of the machining zone, in its longitudinal direction, is less than the smallest radius of curvature of the workpiece surface.

The process according to the invention can be implemented in particularly simple manner if the machining zone of the tool, which is oriented in a fixed position, contains all the slants which occur in the workpiece surface to be machined in its progression, so that the tangent prerequisite can be fulfilled in all machining positions, simply by translational positioning movements between the tool and the workpiece. In this case, the tool and the workpiece are moved relative to one another by purely translational positioning movements, in such a way that for every machining position, a related point of action along the machining zone is selected, according to the requirements of the tangent prerequisite. This method of procedure is particularly well suited for surface machining of small workpieces, such as contact lenses. The machining precision and surface quality that can be achieved are decisively dependent on the geometrical shape accuracy of the tool in the area of the machining zone.

According to another advantageous form of the invention, particularly high demands with regard to surface quality and shape precision can be fulfilled in that the tool and the workpiece are moved relative to one another by means of translational and rotational positioning movements, according to the requirements of the tangent prerequisite, with the same point along the machining zone being selected as the point of action at all times. With this measure, the influence of the geometrical precision of the tool machining zone on the shape precision and surface quality that can be achieved is eliminated. In order to achieve longer useful life of the tools, different points along the machining zone of the tool can be selected as the point of action for different machining processes, so that the wear on the tool which occurs during machining is distributed over the entire machining zone.

For special tasks, it can also be advantageous if the tool and the workpiece are moved relative to one another by means of translational and rotational positioning movements, according to the requirements of the tangent prerequisite, with at least partially different points along the machining zone being selected as the points of action for different machining positions.

In order to achieve high working speeds, it is advantageous if the workpiece or the tool are subjected to a fast rotational removal movement around a workpiece or tool axis. As a matter of principle, however, translational removal movements are also possible according to the invention.

A device for implementing the process according to the invention, in which the tool is clamped in a tool holder and the workpiece is arranged on a workpiece holder, where one of the holders is arranged on a compound slide that carries out the positioning movement, it is proposed, according to the invention, that a pivot head which can be pivoted around an axis which is substantially perpendicular to one of the displacement axes of the compound slide, and holds the tool holder or the workpiece holder, is arranged on the compound slide. It is practical if the tool is clamped in such a way that the pivot head is pivoted around an axis that is substantially parallel to the axis of curvature of the machining zone of the tool.

Furthermore, according to the invention, the workpiece holder or the tool holder can be arranged on a spindle, preferably one that rotates, where either the spindle head as such is arranged on the pivot head, or a pivot head which holds the workpiece holder or the tool holder is arranged on the spindle. Particularly high precision demands can be fulfilled in that the positioning movements are controlled by a CNC control, according to the requirements of the tangent prerequisite.

Figure 1B:
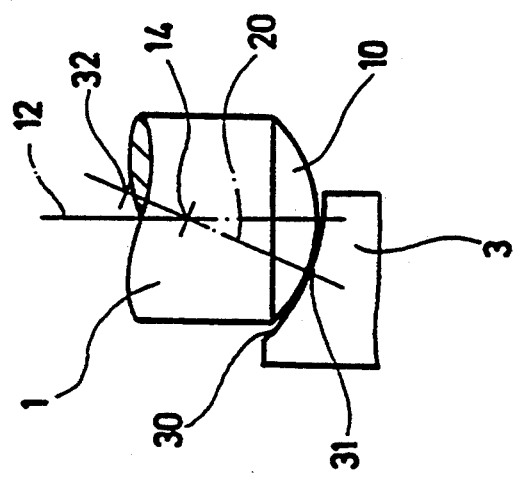
Figure 1C:
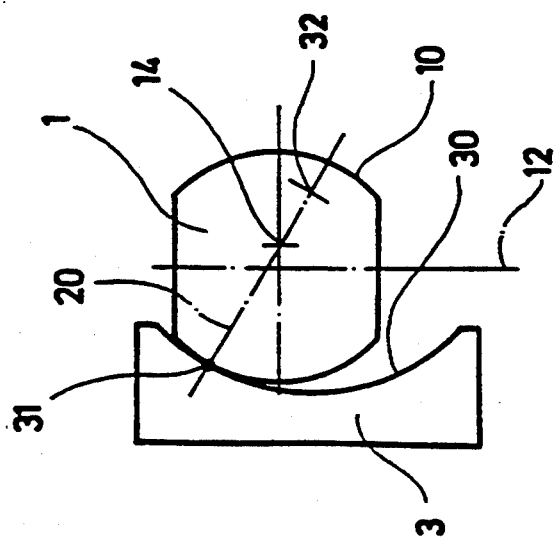
Figure 2A:
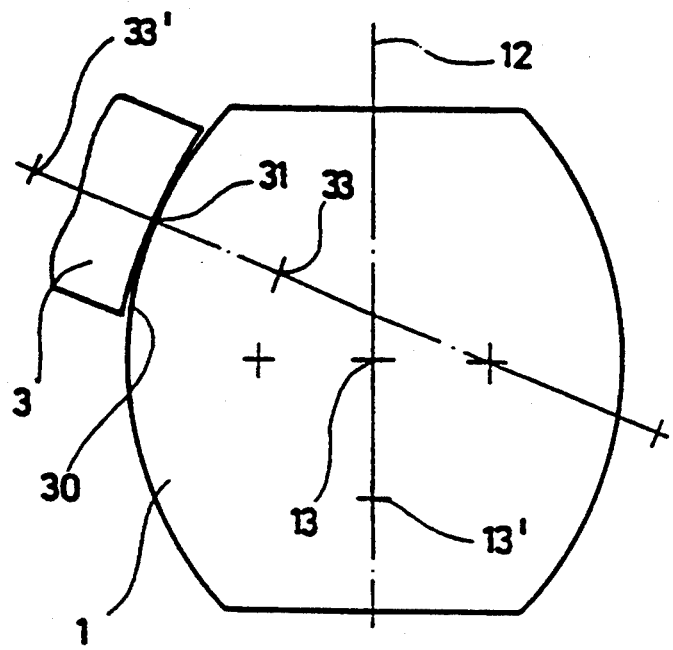
Figure 2B:
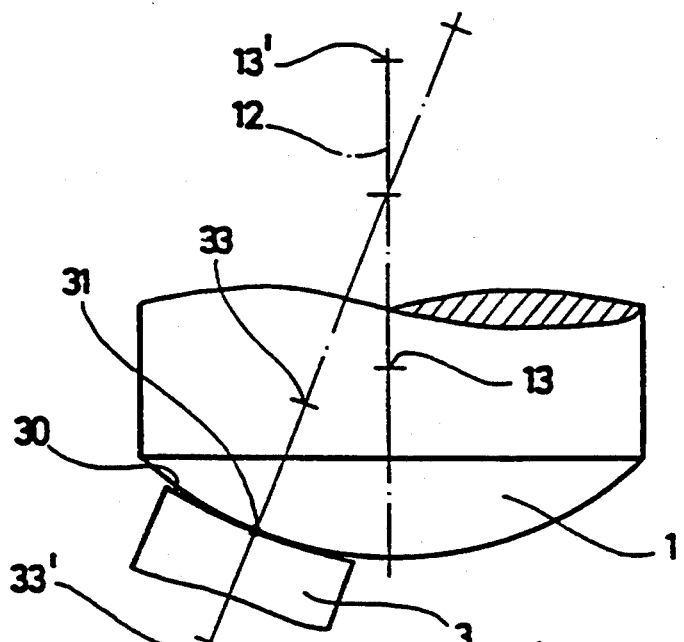
Figure 2C:
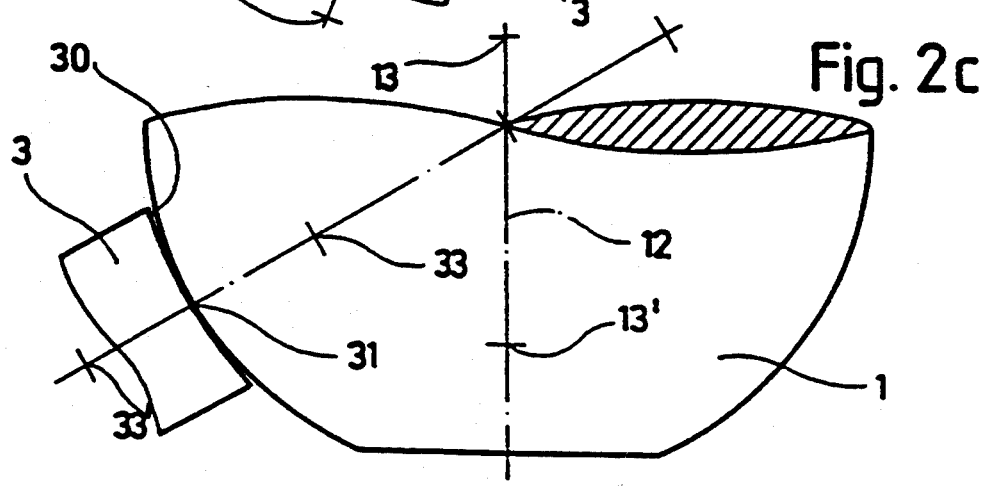
Figure 5:
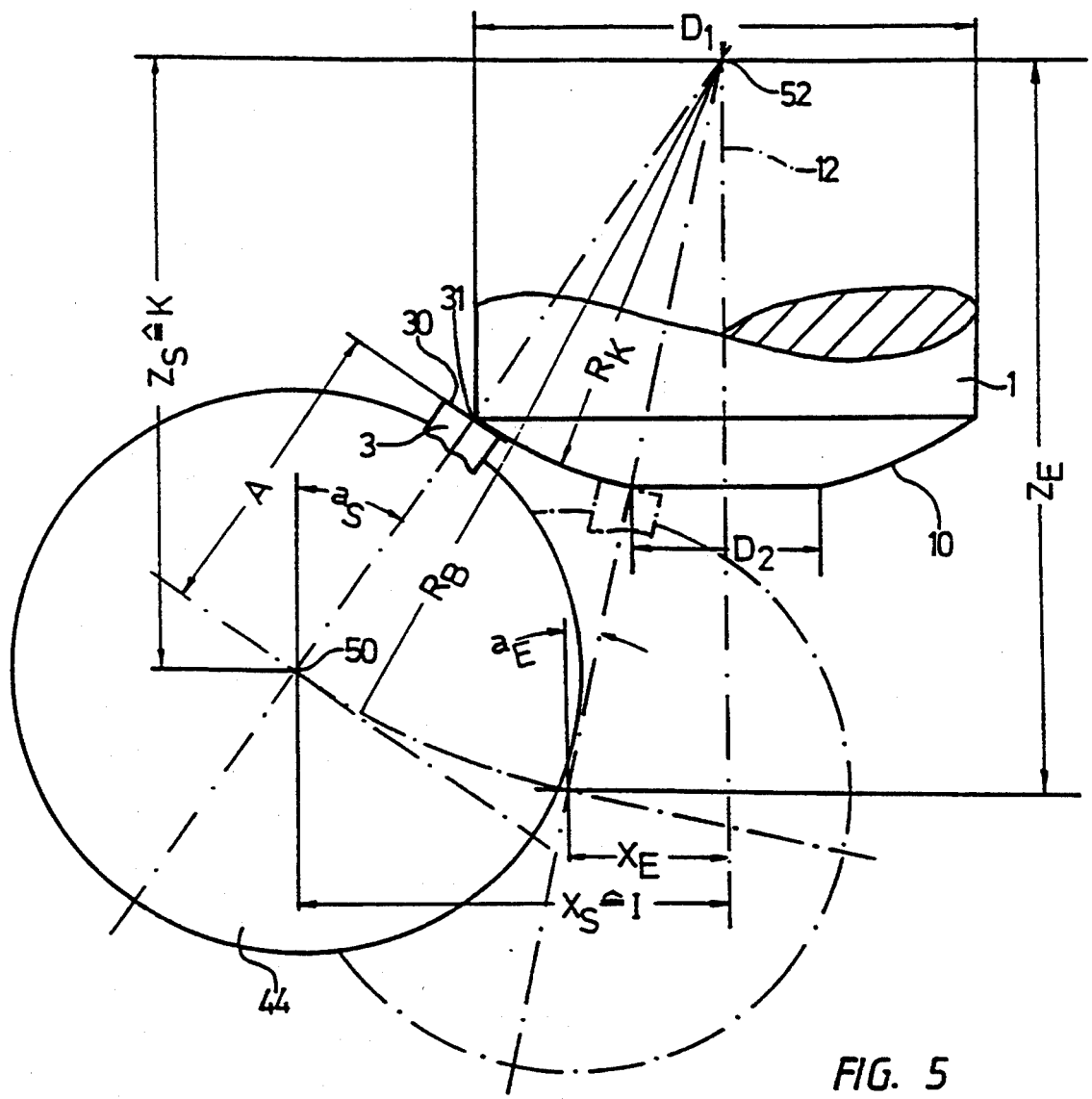

In the following, the invention is explained in greater detail, on the basis of some embodiments shown in schematic manner in the drawings. These show:

FIGS. 1a to 1c, the progressive machining principle applied to three machining examples, using tools for purely translational positioning movements;

FIGS. 2a to 2c, the progressive machining principle for the three machining examples according to FIG. 1, using tools for combined translational and rotational positioning movements;

FIGS. 3a to 3c, the progressive machining principle corresponding to FIG. 2, in the case of three examples with a concave workpiece surface;

FIG. 4 a schematic diagram of a CNC-controlled lathe modified for progressive machining;

FIG. 5 a schematic representation of an example of machining that can be performed with the lathe according to FIG. 4.

Figure 6:
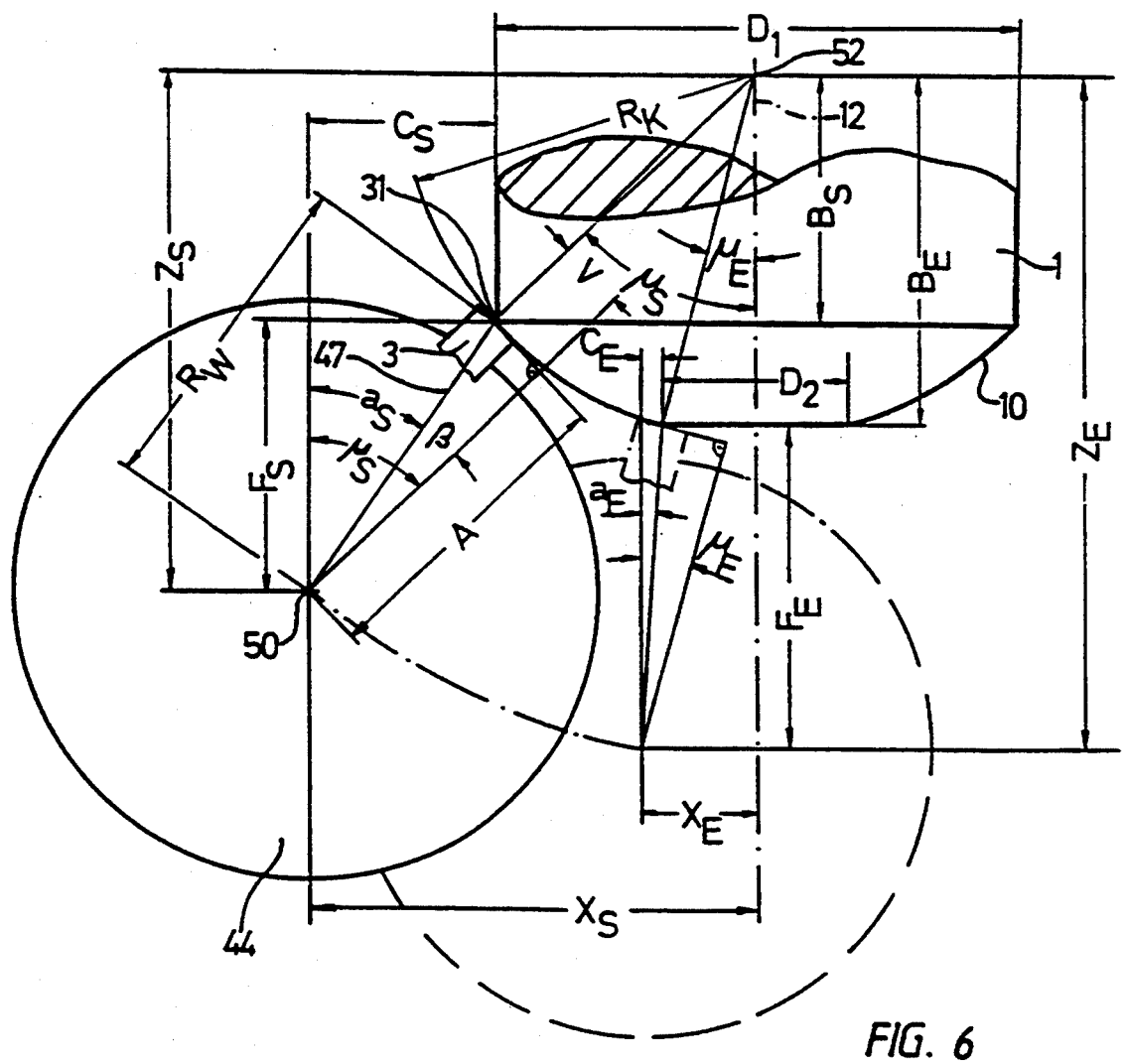

FIG. 6 a schematic representation of an example of machining that can be performed with the lathe according to FIG. 4.

Figure 7:
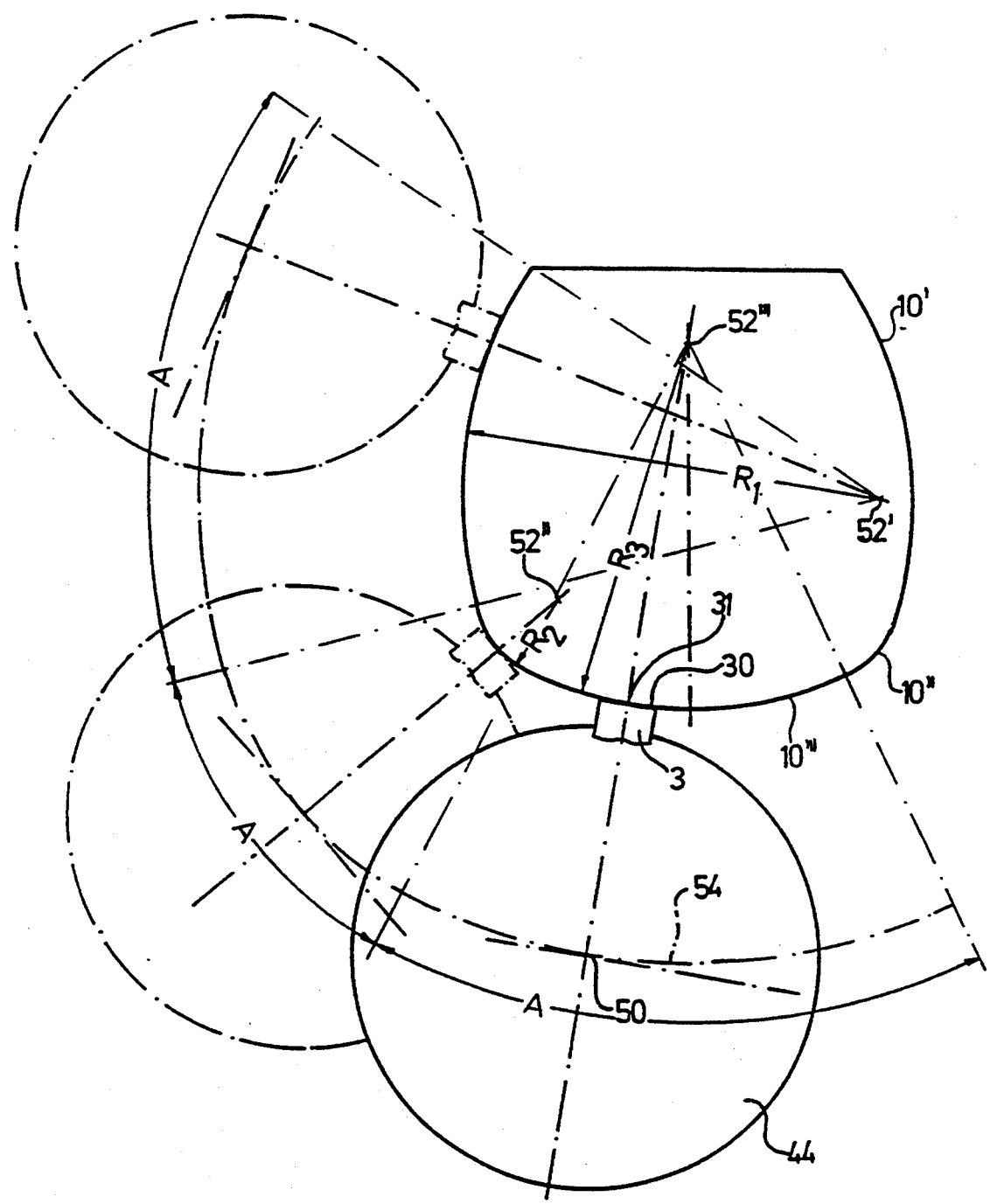

FIG. 7 a schematic representation of an example of machining that can be performed with the lathe according to FIG. 4.

Figure 8:
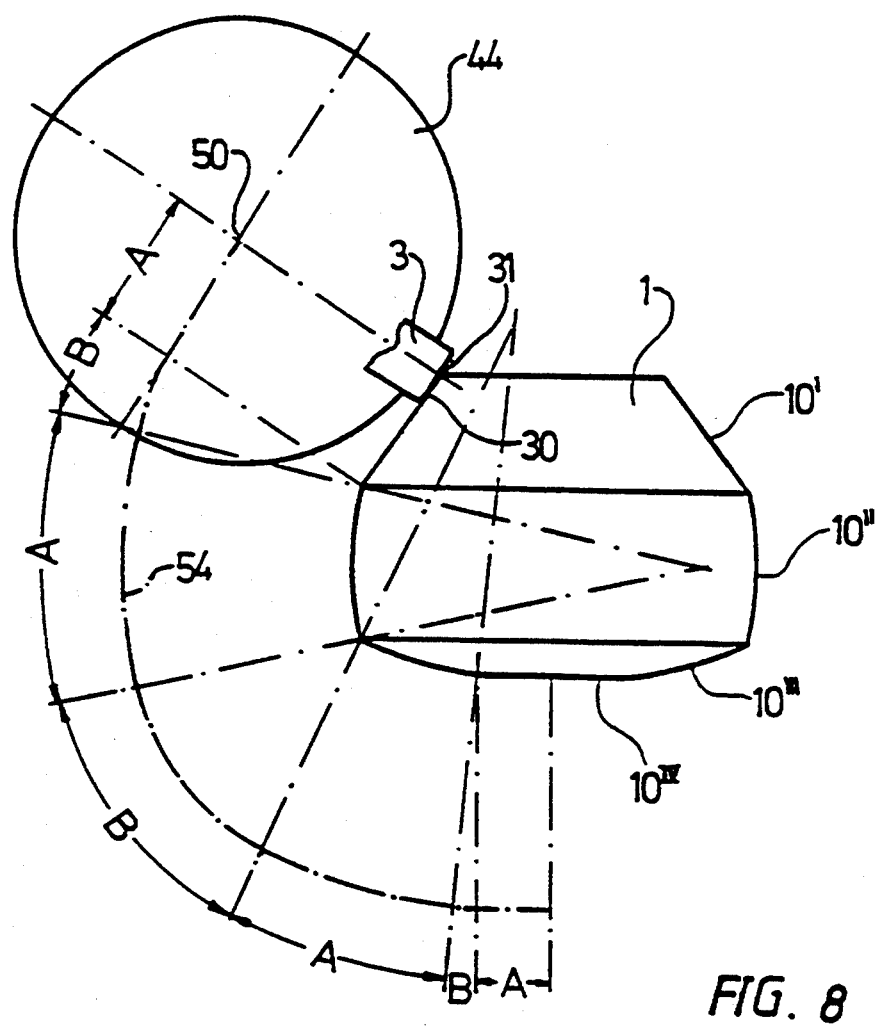

FIG. 8 a schematic representation of an example of machining that can be performed with the lathe according to FIG. 4.

The basic diagrams according to FIGS. 1 to 3 show a workpiece 1, to be machined on a part 10 of its surface, which performs a removal movement rotating about an axis 12, as well as a tool 3, which acts on the workpiece surface 10 to be machined, with an extended machining zone 30, for example structured as a blade, at a point of action 31, performing a positioning movement. In the case of FIGS. 1a, 2a and 3a, it is the mantle surface, in the case of FIGS. 1b, 2b and 3b, it is the frontal surface, and in the case of FIGS. 1c, 2c and 3c, it is a frontal slanted surface which is subjected to the progressive machining. For machining of convex workpiece surfaces 10, a tool 3 with a concave machining zone 30 is selected, with a radius of curvature that is greater in amount than the greatest radius of curvature of the workpiece surface 10 in the cutting plane in question (FIGS. 1 and 2). Vice versa, in the case of machining of concave workpieces, a tool with a convex machining zone 30 is selected, with a radius of curvature that is less than the smallest radius of curvature of the workpiece surface 10 in the cutting plane in question (FIG. 3). The tangent prerequisite described above is indicated in the figures in that the center points of curvature 14, 32 of the workpiece surface 10 to be machined and the machining zone 30 of the workpiece 1 are arranged on a common straight line 20, which intersects the workpiece surface 10 and the machining zone 30 in the instantaneous machining point 31.

In the case of the embodiments shown in FIGS. 1a, 1b and 1c, the positioning movement between the workpiece 1 and the tool 3 is exclusively translational. In order to be able to meet the tangent prerequisite, all slants of the workpiece surface to be machined must therefore be contained in the machining zone 30 of the tool 3, for which reason relatively large tool dimensions are required, in comparison with the workpiece surface to be machined. Since the point of action migrates along the machining zone 30 during the course of progressive machining, there are limits to the precision of the surface machining, due to the geometric precision of the machining zone on the tool used.

In the embodiments shown in FIGS. 2 and 3, an additional rotational degree of freedom around any desired axis 33 or 33' of the tool 3, or, for example 13 or 13' of the workpiece, is added to the translational movement in two planes. In this way, the tangent prerequisite can be met at the instantaneous machining point also by the fact that it is always the same point of action which makes contact along the machining zone 30, so that the influence of the geometrical precision of the machining zone 30 on the shape precision and surface quality of the surface 10 to be machined is eliminated. Furthermore, with this measure, the tool dimensions can be significantly reduced, as is evident from FIGS. 2 and 3 in comparison with FIG. 1.

FIG. 4 shows how a lathe can be refitted for implementing the progressive machining described within the scope of FIGS. 2 and 3. The lathe contains a spindle head 15 holding the workpiece 1 in a workpiece holder 14, the spindle of which performs a rotating removal movement around the axis 12. The tool 3 is arranged on a compound slide 4 consisting of a cross-slide 40 and a longitudinal slide 42, which in turn is equipped with a pivot head 44, formed as a round table, to hold the tool holder 46 which holds the tool 3. The translational drive of the cross-slide 40 and the longitudinal slide 42, as well as the rotational drive of the pivot head 44, is carried out via a regulated drive 41, 43, 45 for each of them, which in turn can be controlled via a common CNC control 5, performing a coupled translational and rotational positioning movement.

In the machining example according to FIG. 5, a spherical segment 10 with a radius $R_K$ which extends between the radius angles $a_S$ and $a_E$ relative to the spindle axis 12 is produced on the workpiece 1, which is rotating around the spindle axis 12. The tool 3, which is structured as a lathe chisel with an extended, preferably slightly concave blade 30, is rigidly clamped on the round table 44, and can be positioned, together with the latter, in the direction of the X and Z axes, translationally in the ZX plane (plane of the drawing) by means of a cross-slide, not shown, and rotationally around a round axis 50 of the round table 44, perpendicular to the ZX plane. The distance A between the point of action 31 of the blade and the round axis 50 can be determined by means of a microscope and the measuring system of the machine. It is practical if the center of the spherical segment 10 is assumed to be the workpiece zero point 52. The start and end coordinate values of the round axis $a_S$, $a_E$, $X_S$, $Z_S$, $X_E$ and $Z_E$ therefore relate to the workpiece zero point. With the prerequisite that the tangent stands perpendicular to the radius vector of the round table through the point of action 31 of the blade 30, in the ZX plane, the following equations are obtained for the start angle $a_S$ and the end angle $a_E$ of the round table:

$$a_S = \arcsin \frac{\frac{1}{2} D_1}{R_K} \quad (1a)$$

$$a_E = \arcsin \frac{\frac{1}{2} D_2}{R_K} \quad (2a)$$

where $R_K$, $D_1$ and $D_2$ are the radius and diameter values of the spherical segment 10 with reference to the spindle axis 12, which are assumed to be known from FIG. 5.

Taking into consideration the tangent prerequisite at the point of action 31, the following equations are furthermore obtained for the start and end coordinates of the center point path of the round table 44:

$X_S = R_B \sin a_S$ (1b)
$Z_S = R_B \cos a_S$ (1c)
$X_E = R_B \sin a_E$ (2b)
$Z_E = R_B \cos a_E$ (2c)

where $R_B = A + R_K$ stands for the path radius of the center point path.

For machining of the spherical segment 10 according to FIG. 5, the following information has to be contained in a program record of the CNC program:

an instruction for circular arc interpolation in the counter-clockwise direction (command G03)

the end coordinates $X_E$ and $Z_E$ depending on the control possibilities, either the radius $R_B$ or the interpolation parameters I and K, which correspond to the start coordinates $X_S$ and $Z_S$ in the embodiment shown the end angle $a_E$ of the round axis.

The movement progression is represented as a superimposition of two translational movements along the axes X and Z with circular interpolation and as a rotational movement around the round axis 50 (angle a) with linear interpolation.

The machining example according to FIG. 6 is modified relative to the machining example shown in FIG. 5 in that the blade 30 of the tool 3 is not oriented perpendicular, but rather at a clearance angle B at an angle to the radius vector of the round table 44, with its tangent. For the start and end coordinates of the round table center point, the following equations are obtained, taking into consideration the tangent prerequisite, at the point of action 31 of the tool 3 and using the parameters indicated in FIG. 6:

$$a_S = \mu_S - \beta = \arcsin \frac{\frac{1}{2} D_1}{R_K} - \arctan \frac{V}{A} \quad (3a)$$

$$X_S = \frac{1}{2} D1 + C_S = \frac{1}{2} D_1 + R_W \sin a_S \quad (3b)$$

$$Z_S = B_S + F_S = R_K \cos \mu_S + R_W \cos a_S \quad (3c)$$

$$a_E = \mu_E - \beta = \arcsin \frac{\frac{1}{2} D_2}{R_K} - \arctan \frac{V}{A} \quad (4a)$$

$$X_S = \frac{1}{2} D1 + C_S = \frac{1}{2} D_2 + R_W \sin a_E \quad (4b)$$

$$Z_E = B_E + F_E = R_K \cos \mu_E + R_W \cos a_E \quad (4c)$$

$$\text{where } R_W = \frac{A}{\cos \beta}$$

The distance V of the point of action 31 from the radius vector of the round table is determined by means of a microscope and the measuring system of the machine.

Between the start point $X_S$, $Z_S$ and the end point $X_E$, $Z_E$, the X and Z axes pass through a circular interpolation on which a linear interpolation of the round axis a between $a_S$ and $a_E$ is superimposed.

Rotation-symmetrical workpieces with several consecutive contour segments can also be produced in the manner described above. The contour segments can be structured not only in spherical shape, but also in cylindrical, cone or flat shape, and can be adjacent to one another either tangentially or non-tangentially.

In the machining example shown in FIG. 7, the workpiece 1 has three spherical contour segments 10', 10" and 10''', which change over into one another tangentially. Accordingly, the movement progression of the round table equipped with the tool 3 is divided into three machining segments A, which are formed by three different CNC records in the sense of the embodiments according to FIGS. 5 and 6, on the basis of the different spherical center points 52', 52" and 52''', and the different spherical radii $R_1$, $R_2$ and $R_3$. The center point of the round table passes through the path curve 54, shown with a dot-dash line, at a constant distance from the contour of the workpiece 1.

In the embodiment according to FIG. 8, the workpiece 1 to be machined has four contour segments 10', 10", 10''' and 10$^{IV}$, which have rotational symmetry, of which the segment 10' is cone-shaped, the segments 10" and 10''' are spherical and the segment 10$^{IV}$ is flat. The transition between the contour segments is non-tangential, so that the movement progression of the round table 44 during the machining process is divided into four machining segments A and three correction segments B, which are reproduced in the CNC programming by separate records. In the cone-shaped machining segment 10' and the flat one 10$^{IV}$, the round table is moved only in translational movement, while in the correction segments B the movement is purely rotational around the round axis (to adjust the new tangent prerequisites). To produce the spherical surface areas 10" and 10''' a coupled translational and rotational movement progression in all three axes, in the sense of the embodiments according to FIGS. 5 and 6, is necessary. The path curve 54 of the center point of the round table, shown with a dot-dash line in FIG. 8, demonstrates a constant distance from the workpiece surface to be machined.

I claim:

1. A process for machining a workpiece with a tool comprising a turning cutter having a machining zone for engaging and cutting the workpiece to remove material from the workpiece to form a substantially convex-curved surface on the workpiece, the tool machining zone having a substantially concave shape with a radius of curvature that is greater than the largest radius of curvature of the convex-curved surface of the workpiece to be machined, the process comprising:

moving the workpiece and the tool relative to one another in a machining movement wherein only a portion of the machining zone of the tool engages the surface of the workpiece defining an instantaneous machining zone, at which material is removed from the workpiece in a direction that is substantially at a right angle relative to a tangent of the machining zone of the tool and a tangent of the surface of the workpiece substantially coinciding at the instantaneous machining zone, and moving the tool and the workpiece relative to one another by translational positioning movements, wherein for every machining position, the tangent of the machining zone of the tool and the tangent of the surface of the workpiece substantially coincide at the instantaneous machining zone.

2. A process as defined in claim 1, wherein for different machining processes, different portions of the machining zone of the tool are alternately selected as the instantaneous machining zone.

3. A process as defined in claim 1, wherein the axes of the positioning movements are controlled by a CNC controller.

4. A process as defined in claim 1, wherein the tool and the workpiece are moved relative to one another by means of translational and rotational positioning movements, and at least partially different points along the machining zone are selected as the instantaneous machining zone for different machining positions.

5. A process as defined in claim 1, wherein at least one of the workpiece and the tool is subjected to a translational movement to remove material from the workpiece.

6. A process for machining a workpiece with a tool comprising a turning cutter having a machining zone for engaging and cutting the workpiece to remove material from the workpiece to form a substantially convex-curved surface on the workpiece, the tool machining zone having a substantially concave shape with a radius of curvature that is greater than the largest radius of curvature of the convex-curved surface of the workpiece to be machined, the process comprising:

moving the workpiece and the tool relative to one another in a machining movement wherein only a portion of the machining zone of the tool engages the surface of the workpiece defining an instantaneous machining zone at which material is removed from the workpiece in a direction that is substantially at a right angle relative to a tangent of the machining zone of the tool and a tangent of the surface of the workpiece substantially coinciding at the instantaneous machining zone, and moving the tool and the workpiece relative to one another by translational and rotational positioning movements, wherein for every machining position, the same portion of the machining zone is selected for the instantaneous machining zone.

7. A process as defined in claim 6, wherein the axes of the positioning movements are controlled by a CNC controller.

8. A process for machining a workpiece with a tool comprising a turning cutter having a machining zone for engaging and cutting the workpiece to remove material from the workpiece to form a substantially concave-curved surface on the workpiece, the tool machining zone having a substantially convex shape with a radius of curvature that is less than the smallest radius of curvature of the concave-shaped surface of the workpiece to be machined, the process comprising:

moving the workpiece and the tool relative to one another in a machining movement wherein only a portion of the machining zone of the tool engages the surface of the workpiece defining an instantaneous machining zone at which material is removed from the workpiece in a direction that is substantially at a right angle relative to a tangent of the machining zone of the tool and a tangent of the surface of the workpiece substantially coinciding at the instantaneous machining zone, and moving the tool and the workpiece relative to one another by translational and rotational positioning movements, wherein for every machining position, the same portion of the machining zone is selected for the instantaneous machining zone.

9. A process as defined in claim 8, wherein the axes of the positioning movements are controlled by a CNC controller.

10. A device for machining a workpiece supported by a workpiece holder including a tool comprising a turning cutter having a substantially curved machining zone for machining the workpiece and supported by a tool holder, wherein the workpiece and the tool are movable relative to one another in a machining movement for removing workpiece material to form a curved surface on the workpiece, wherein only a portion of the machining zone of the tool engages the workpiece in substantially all machining positions defining an instantaneous machining zone, such that material is removed from the workpiece at the instantaneous machining zone in a direction that is substantially at a right angle relative to a tangent of the machining zone of the tool and a tangent of the surface of the workpiece substantially coinciding at the instantaneous machining zone.

11. A device as defined in claim 10, wherein the tool is the blade of a chisel of a lathe.

12. A device as defined in claim 10, wherein the machining zone of the tool defines a substantially curved shape.

13. A device as defined in claim 12, wherein the machining zone of the tool defines a substantially concave curvature for forming a convex-shaped surface on the workpiece, and the concave curvature of the machining zone defines a greater radius of curvature than the largest radius of curvature of the surface of the workpiece.

14. A device as defined in claim 12, wherein the machining zone of the tool defines a substantially convex curvature for forming a concave-shaped surface on the workpiece, and the convex curvature of the machining zone defines a radius of curvature less than the smallest radius of curvature of the surface of the workpiece.

15. A device as defined in claim 10, wherein the tool and the workpiece are movable relative to one another by translational positioning movements.

16. A device as defined in claim 10, wherein the tool and the workpiece are movable relative to one another by translational and rotational positioning movements, and the same portion of the machining zone can be selected as the instantaneous machining zone in substantially all machining positions.

17. A device as defined in claim 10, wherein different portions of the machining zone of the tool can be alternately selected as the instantaneous machining zone for different machining processes.

18. A device as defined in claim 10, wherein the tool and the workpiece are moved relative to one another in translational and rotational positioning movements, and at least partially different points of the machining zone are selected as the instantaneous machining zone for different machining positions.

19. A device as defined in claim 10, wherein the tool holder and the workpiece holder are supported on a compound slide for performing the positioning movements, and the tool holder is further supported on a pivot head in turn supported on the compound slide and pivotable about an axis substantially parallel to the axis of curvature of the machining zone of the tool.

20. A device as defined in claim 10, wherein at least one of the workpiece holder and the tool holder is supported on a spindle head rotatably mounted on a pivot head.

21. A device as defined in claim 10, further comprising a CNC control unit for controlling the machining movements.

* * * * *

UNITED STATES PATENT AND TRADEMARK OFFICE
CERTIFICATE OF CORRECTION

PATENT No. : 5,417,130

DATED : May 23, 1995

INVENTOR(S): Joachim Dorsch

It is certified that error appears in the above-identified patent and that said Letters Patent is hereby corrected as shown below:

Title page, [54] and Column 1, line 2, delete in title "And".

Title page, [73] Assignee should read:

--Carl Benzinger GmbH & Co. Präzisionsmaschinenbau--.

Signed and Sealed this

Twentieth Day of May, 1997

Attest:

BRUCE LEHMAN

Attesting Officer

Commissioner of Patents and Trademarks